(12) United States Patent
Fry

(10) Patent No.: US 11,599,330 B2
(45) Date of Patent: Mar. 7, 2023

(54) AUDIO MANAGEMENT FOR GUESTS

(71) Applicant: BlackBerry Limited, Waterloo (CA)

(72) Inventor: Darrin Kenneth John Fry, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/304,960

(22) Filed: Jun. 29, 2021

(65) Prior Publication Data

US 2022/0413793 A1 Dec. 29, 2022

(51) Int. Cl.
*H04B 3/00* (2006.01)
*G06F 3/16* (2006.01)

(52) U.S. Cl.
CPC .................................. *G06F 3/165* (2013.01)

(58) Field of Classification Search
CPC ....................................................... G06F 3/165
USPC ..................................................... 381/81, 77
See application file for complete search history.

(56) References Cited

U.S. PATENT DOCUMENTS

| | | | | |
|---|---|---|---|---|
| 2009/0306891 A1* | 12/2009 | Jeon | ........................ | G01C 21/36 701/533 |
| 2012/0259440 A1 | 10/2012 | Zhang | | |
| 2015/0110287 A1* | 4/2015 | Holdren | ................... | G06F 3/167 381/86 |
| 2020/0293357 A1* | 9/2020 | Goldmann | ............ | G06F 9/4418 |
| 2020/0374626 A1 | 11/2020 | Jarvis | | |
| 2022/0060827 A1* | 2/2022 | Forth | ........................ | H04R 3/12 |

FOREIGN PATENT DOCUMENTS

| | | |
|---|---|---|
| CN | 112068794 | 12/2020 |
| JP | 2013223031 | 10/2013 |
| WO | 2018223608 | 12/2018 |

OTHER PUBLICATIONS

Blackberry, QNX Momentics IDE User's Guide, selected pages, dated May 12, 2021 (16 pages).
Blackberry, QNX, Acoustics Management Platform available Mar. 28, 2021 (9 pages).
AGL Instrument Cluster Expert Group, AGL Instrument Cluster, AGL_ICE_EG_SondMng_RFQ_ A01, Jul. 2020 (7 pages).
AGL Instrument Cluster Expert Group, AGL Instrument Cluster, AGL_ICE_EG_SondMng_RFQ_ A02, Oct. 2020 (10 pages).
AGL Instrument Cluster Expert Group, AGL Instrument Cluster, AGL_ICE_EG_SondMng_RFQ_ A03, Oct. 2020 (11 pages).
European Patent Office, Extended European Search Report for Appl. 22174239.8 dated Nov. 17, 2022 (11 pages).

* cited by examiner

*Primary Examiner* — Ammar T Hamid
(74) *Attorney, Agent, or Firm* — Trop, Pruner & Hu, P.C.

(57) ABSTRACT

In some examples, a control audio management engine is configured to interact with guest audio services in respective guests that have different audio management capabilities. The control audio management engine receives an indication of a start of a first audio in a first guest of the guests, the indication comprising an audio stream. The control audio management engine sends, to a second guest of the guests, control information to affect playback of a second audio that is playing in the second guest.

20 Claims, 7 Drawing Sheets

AUDIO MANAGEMENT FOR GUESTS

BACKGROUND

A vehicle can include various audio sources, such as a media player, a navigation system, a safety alert system, and so forth. Each of these audio sources can play audio at any time, in response to respective events. The events can include user activation events, in which user activations of input devices cause playing of audio from corresponding audio sources. As an example, a user may turn on a media player to play music. As another example, a user may activate a navigation system of the vehicle. As a further example, the vehicle may include a safety alert system that can issue audio alerts under certain conditions.

BRIEF DESCRIPTION OF THE DRAWINGS

Some implementations of the present disclosure are described with respect to the following figures.

Figure 1:
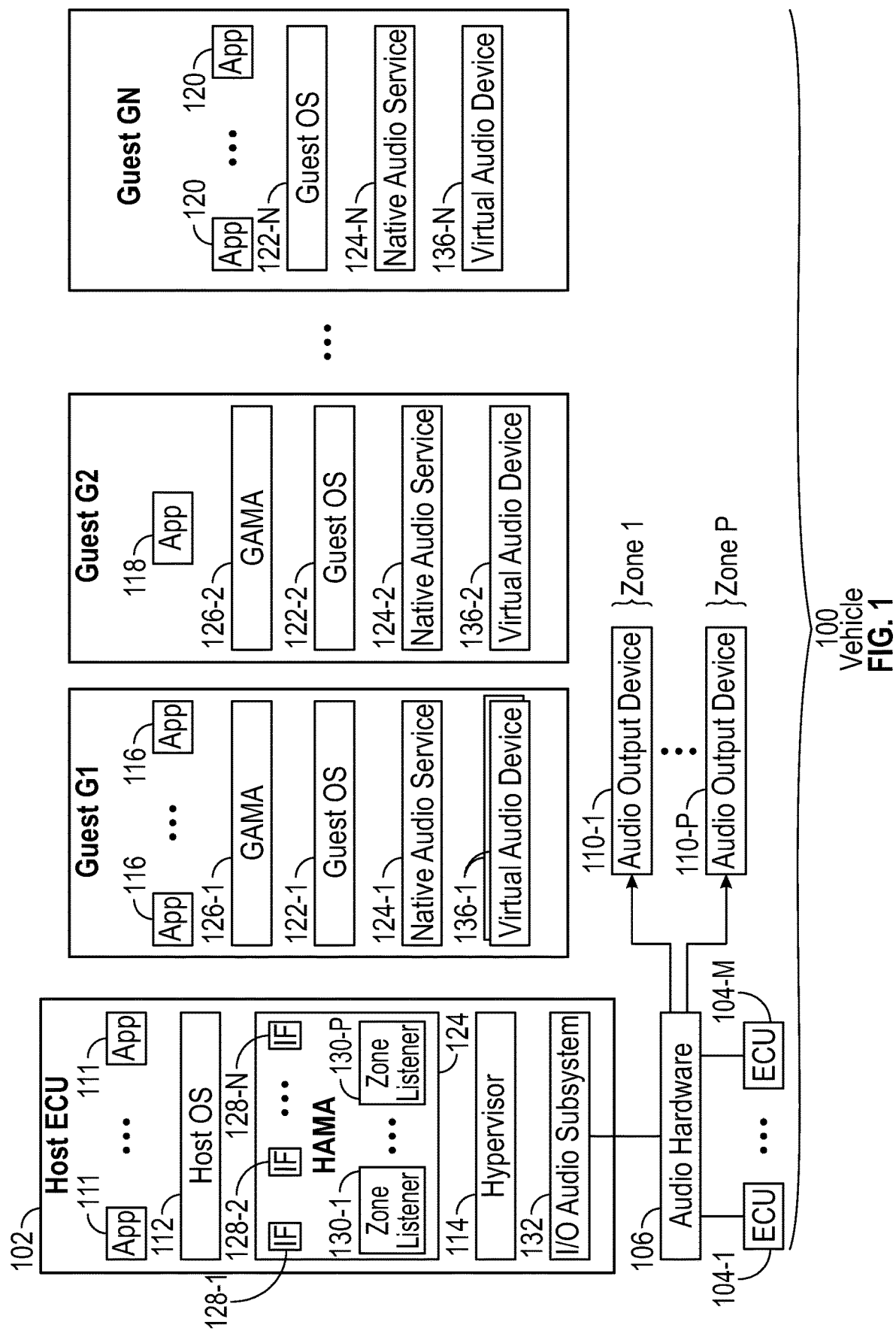
FIG. 1 is a block diagram of an audio system of a vehicle according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., space planes, space shuttles, space capsules, space stations, satellites, etc.), watercraft (e.g., ships, boats, hovercraft, submarines, etc.), railed vehicles (e.g., trains and trams, etc.), bicycles and other types of vehicles including any combinations of any of the foregoing, whether currently existing or after arising.

Although reference in the present discussion is made of audio systems in vehicles, techniques or mechanisms according some implementations of the present disclosure can be applied to audio systems in other contexts, such as in-home audio systems, audio systems in retail or other establishments, and so forth.

As shown in FIG. 1, a vehicle 100 can include multiple electronic control units (ECUs) that control various functionalities of the vehicle. For example, there may be an ECU for the vehicle's navigation system, an ECU for controlling the vehicle's engine, an ECU to control a safety system of the vehicle, an ECU for a media player in the vehicle, and so forth. Additionally, the vehicle may include a main ECU (referred to as a host ECU 102 in FIG. 1) that can coordinate interactions with the multiple subsystems of the vehicle, including the multiple ECUs.

In addition to the host ECU 102, FIG. 1 shows additional ECUs 104-1 to 104-M (M≥1) that can control various functionalities of the vehicle 100. The host ECU 102 and the ECUs 104-1 to 104-M can play audio using audio hardware 106 of the vehicle 100. The audio hardware 106 can include audio buffers, audio mixers, audio amplifiers, and so forth. The audio hardware 106 can cause audio output from any of various sources in the vehicle 100 to be played on one or more audio output devices 110-1 to 110-P (P≥1). An audio output device may include a speaker or any other device that is capable of making an audible sound in response to input audio signals.

In some examples, the host ECU 102 can execute a host operating system (OS) 112 that can perform various functionalities in the vehicle 100. The host OS 112 can include a QNX OS, an ANDROID OS, a LINUX OS, or any other type of OS.

The host ECU 102 can also execute various application programs 111, which may include audio sources. For example, the application programs 111 can include a media player, a navigation application, a safety alert application, and so forth. Although audio sources are depicted as application programs in the example of FIG. 1, it is noted that there can be other types of audio sources in other examples.

As the audio environment of a vehicle has become increasingly more complex, audio sources may be dispersed in many different sub-environments of the vehicle 100. For example, the sub-environments can include virtual environments in the form of virtual machines (VMs) executed on one or more computers of the vehicle 100. The VMs are managed by a hypervisor 114 executed in the host ECU 102 or in another computer. The hypervisor 114, also referred to as a virtual machine monitor (VMM), refers to software and/or firmware that creates and runs VMs, and manages the sharing of physical resources by the VMs. An example of a physical resource is the audio hardware 106 of the vehicle 100.

Other sub-environments including audio sources can include ECUs (e.g., 104-1 to 104-M), and so forth.

In the ensuing discussion, a "guest" can refer to a VM, an ECU, or any sub-environment that includes one or more audio sources, where the sub-environment includes an audio management capability that can be different from audio management capabilities of other sub-environments.

Examples of audio-management capabilities include any or some combination of the following: support for single or multiple audio sinks, an ability to route audio to one or more audio sinks based on the audio's usage or type, an ability to route audio to one or more audio sinks based on a transient or non-transient nature of the audio, an ability to detect or be notified of audio management state changes, and so forth.

An "audio sink" can refer to either software, firmware, or hardware to receive audio to route to another element, such as an audio output device or an intermediate component. In some examples discussed further below, an audio sink can include a virtual audio device.

Examples of audio types include the following: media such as music, an audio announcement, an audio alert, and so forth.

Examples of audio usage can refer whether the audio is transient or non-transient. Transient audio refers to audio that is transitory in nature and is not expected to last for more than some specified time duration, such as an announcement from a navigation system or a safety alert system. Non-transient audio refers to audio that can last for a relatively long time duration, such as music from a media player.

FIG. 1 shows multiple guests G1, G2, ..., GN, where N≥3. Although 3 guests are depicted in FIG. 1, it is noted that in other examples, less than 3 guests or more than 3 guests can be present in the vehicle 100. In some examples, the multiple guests G1, G2, ..., GN can run in the host ECU 102, or can run in multiple ECUs, including the ECUs 104-1 to 104-M. Some of the guests may be virtual machines, while other guests can be in the form of software or firmware running in an ECU or another computer.

In examples discussed herein, it is assumed that the different guests G1, G2, ..., GN have different audio management capabilities. Since the host ECU 102 can also include audio sources (in the form of the application programs 111, for example), the host ECU 102 may have an audio management capability different from the audio management abilities of guests G1, G2, ..., GN.

In the example of the FIG. 1, guest G1 includes application programs 116. Guest G2 includes an application program 118, and guest GN includes application programs 120. The application programs 116, 118, and 120 can be audio sources that are capable of generating audio to be played on one or more audio output devices, such as 110-1 to 110-P. Although FIG. 1 shows each of guests G1, G2, ..., GN with specific numbers of application programs, in other examples, each guest can have a different number (1 or greater than 1) of application programs (or more generally audio sources).

Each guest G1, G2, ..., GN includes a respective guest OS 122-1, 122-2, ..., 122-N. Each guest OS can include a QNX OS, an ANDROID OS, a LINUX OS, or any other type of OS. The guest OS of one guest may be the same type as or of a different type from the guest OS of another guest.

As further shown in FIG. 1, each guest G1, G2, ..., GN includes a respective native audio service 124-1, 124-2, ..., 124-N. A "native audio service" can refer to service that performs audio functionalities, including routing audio from an audio source (e.g., an application program) in a guest through the native audio service to an audio sink, and routing input audio data received from an audio input device, such as a microphone, to an application program in the guest.

To achieve a consistent user experience, audio management is to be coordinated across multiple guests that may run respective OSs with corresponding different audio management capabilities, across remote ECUs that can play audio, and across multiple different zones (e.g., zone 1 to zone P shown in FIG. 1, where P≥1). A "remote" ECU can refer to an ECU that is distinct from the host ECU 102.

A "zone" can refer to a group of components, including one or more guests, that are able to share a corresponding one or more audio output devices. For example, a first zone can include front speakers, a second zone can include rear speakers, a third zone can include left speakers, a fourth zone can include right speakers, and so forth. Other examples of zones are also possible. As an example, in FIG. 1, the audio output device 110-1 can be part of zone 1, and the audio output device 110-P can be part of zone P. There can be more than two zones in other examples. Guest G1 and guest G2 can play audio on the audio output device 110-1 in zone 1, while guest GN can play audio on the audio output device 110-P in zone P. Note that a guest (and more specifically a class 1 guest where different classes are discussed further below) can play audio to multiple zones.

In other examples, the concept of zones is not implemented; i.e., there is just one zone in the vehicle 100.

Mechanisms according to some implementations of the present disclosure are provided to coordinate audio management in a multi-zone, multi-guest, multi-ECU environment, where different guests may have different audio management capabilities. A system wide audio management mechanism is provided to create a cohesive audio experience across the entire environment with minimal loss of audio and minimal audio artifacts. Additionally, the system wide audio management mechanism eases integration of remote audio management systems by supporting the use of native audio-management facilities (e.g., the native audio services 124-1 to 124-N) where such facilities exist.

An example scenario to illustrate an issue is provided below. In this example scenario, it is assumed that audio is being played to a zone in a main cabin of a vehicle. While media is playing from guest G1, a navigation announcement plays from guest G2. During the navigation announcement, the host OS 112 plays a lane departure warning (an example of an audio alert from a safety alert system). While the lane departure warning is playing, media playback is started on guest G3. The host lane departure warning then ends, and the navigation announcement from the guest G2 ends.

In the foregoing example scenario, the following audio management actions should occur. The media from guest G1 should be ducked to a lower sound volume (e.g., half its volume) immediately when the navigation announcement begins. The guest G1 media and the guest G2 navigation announcement should be suspended while the lane departure warning is playing from the host. The new media playback from guest G3 starts in a suspended state due to the higher priority lane departure warning being played by the host, and the media playback of guest G1 should go the paused state due to the new media playback from guest G3.

When the lane departure warning stops, the navigation prompt and media playback from guest G3 resumes, with guest G3's media ducked to a lower sound volume by the navigation prompt. When the navigation prompt ends, the sound volume of the guest G3 media is restored to its desired level.

The system wide audio management mechanism according to some examples of the present disclosure includes a central host audio management agent (HAMA) 124 in the host ECU 102. The HAMA 124 can be implemented using machine-readable instructions (software and/or firmware), in some examples.

In some examples, the HAMA 124 is able to use host and guest audio stream activity and/or state messages to determine audio usages or types of respective audio being played in a host or guest. As used here, a "host" can refer to any or some combination of the following: the host ECU 102, the host OS 112, or a program executing in the host ECU 102.

The HAMA 124 can send control messages to audio services in guests or the host to affect audio management changes, including, for example, suspending or resuming audio playback, ducking or unducking audio playback, pausing audio playback, and so forth. Each of the suspended state, resumed state, ducked state, paused state, and so forth, of an audio playback can be considered an audio management state of a guest or host.

Suspending an audio from an audio source refers to temporarily stopping playing of the audio from the audio source until a condition is satisfied (e.g., an audio from another audio source has stopped playing or another condition is met), following which the audio from the audio source can resume playing.

Ducking an audio of an audio source refers to reducing the sound volume of the audio (i.e., by making the audio quieter). Pausing an audio of an audio source refers to stopping playback of the audio until specifically resumed by a user (e.g., the user enters a command to resume playback of the audio after pausing). Absent a user input to resume playback of a paused audio, the paused audio will stay in the paused state.

The system wide audio management mechanism according to some examples of the present disclosure further includes guest audio management agents (GAMAs) (also referred to as guest audio management clients) executing (as machine-readable instructions, for example) in some guests. In the example of FIG. 1, guest G1 includes a GAMA 126-1, and guest G2 includes a GAMA 126-2. However, guest GN does not include a GAMA. Rather, the HAMA 124 can interact with the native audio service 124-N of guest GN for managing audio functionalities for guest GN.

The HAMA 124 also includes interface modules 128-1, 128-2, . . . , 128-N to interface with respective audio services in guests G1, G2, GN. The interface modules 128-1 and 128-2 are to interface with GAMAs 126-1 and 126-2, respectively. The interface module 128-N is to interface with the native audio service 124-N of guest GN.

An "interface module" can refer to any type of intermediary that allows a first component to communicate with another component. For example, the interface module can include an application programming interface (API), an inter-process link (IPL), a linked library, and so forth.

As further shown in FIG. 1, the host ECU 102 includes zone listeners 130-1 to 130-P to monitor audio activities in corresponding different zones (e.g., zone 1 to zone P), assuming an example where there are multiple audio zones in the vehicle 100. The zone listeners 130-1 and 130-2 can interact with an input/output (I/O) audio subsystem 132, which can manage the changing of audio management states of respective guests and the host, as well as to provide notifications of audio events to the guests and the host. Further capabilities of the I/O audio subsystem 132 are discussed further below.

Guests G1, G2, . . . , GN further include respective virtual audio devices 136-1, 136-2, . . . , 136-N to which the native audio services 124-1, 124-2, . . . , 124-N can write audio for passing to the I/O audio subsystem 132.

A virtual audio device can include virtual audio buffers that are used to queue audio data as well as certain audio commands, such as start, stop, drop, etc. In the present disclosure, a virtual audio device can be interchangeably used with a virtual audio channel. A virtual audio device (or virtual audio channel) provides a mechanism implemented in software or firmware that an entity (e.g., a native audio service or another entity) can interact with to communicate (send or receive) audio data.

Each native audio service 124-i, i=1 to N, can also include audio buffers to receive audio from corresponding audio sources (e.g., application programs) in guests for routing to one or more audio sinks (e.g., virtual audio devices). Each native audio service 124-i can further include one or more audio buffers to receive input audio for providing to a respective one or more application programs or other entities of the guest. In addition, a native audio service can also include a mixer to mix audio from different audio sources into an audio stream, in some examples.

As a further example, a native audio service can also include multiple mixers for mixing audio of different audio types, such as an audio mixer to mix media from media players, another mixer to mix announcements, another mixer to mix alerts, and so forth. The guest mixers are configured this way to allow the host to know the type of audio arriving via an audio stream from a virtual audio device (in an example where a guest is able to send audio on different virtual audio devices). The host can also include a native audio service (not shown) that is able to mix audio of different types received from different audio sources, e.g., navigation announcement audio mixed with ducked media audio.

The I/O audio subsystem 132 is able to support various audio types, such as media, announcements, alerts, and so forth. In addition, each of the virtual audio devices 136-1, 136-2, . . . , 136-N can be configured to identify its audio stream as one of the audio types, so that an audio stream received by the I/O audio subsystem 132 from a virtual audio device has an identified audio type. In addition, the zone listeners 130-1 and 130-2 are able to detect audio type, audio activity, and preemption state of audio streams. A preemption state of an audio stream can refer to whether or not the audio stream can be preempted by another audio stream.

The HAMA 124 can also maintain configuration information (e.g., in the form of a configuration file) that supports multiple zones and multiple guests. For example, the configuration information can specify which guests are part of which zones. Additionally, the configuration information maintained by the HAMA 124 can indicate which audio types are mapped to what audio usages (e.g., transientness—transient audio or non-transient audio). For example, audio announcements and audio alerts (two audio types) can be mapped by the configuration information to transient audio, while media from media players are mapped by the configuration information to non-transient audio. By using this configuration information, the HAMA 124 can make a quick determination of whether a specific audio from an audio source in a guest is transient audio or non-transient audio.

In accordance with some implementations of the present disclosure, to allow the HAMA 124 to effectively coordinate audio management at the different guests with different audio-management capabilities, the guests can be assigned to one of various different classes. The HAMA 124 can use a class of a guest to determine the expected interaction with the guest, as explained further in connection with FIGS. 2-6 below.

Classes assigned to guests can be included as part of the configuration information maintained by the HAMA 124. For example, the configuration information can specify that guest G1 is assigned class 1, guest G2 is assigned class 2, and guest GN is assigned class 4. Multiple guests can be assigned to the same class.

In some examples, there are four classes of guests based on their audio management capabilities and their virtual I/O configuration.

A class 1 guest has an audio management subsystem (e.g., implemented with a native audio service) that is able to direct audio of different usages to different virtual audio devices (or alternatively, different virtual audio channels of a virtual audio device). For example, the class 1 guest can direct transient audio to a first virtual audio device (or more specifically, a first instance of a virtio-snd driver), non-transient audio to a second virtual audio device (or more specifically, a second instance of a virtio-snd driver), and so forth. A virtio-snd driver refers to a driver according to the VIRTIO framework.

Also, audio of different types (e.g., media, announcements, alerts, etc.) can be directed to different virtual audio devices. As noted further above, a class 1 guest can direct audio to different zones, which can be accomplished by sending the audio to different respective virtual audio devices (e.g., one virtual audio device for one zone and another virtual audio device for another zone).

For a class 1 guest, the HAMA 124 is able to determine an audio management state (suspended, resumed, ducked, paused, etc.) or an audio type of audio being played by a class 1 guest based on audio activities as reflected by audio types used to play audio streams, e.g., if an audio stream of audio type G1_non_trans (which corresponds to a given virtual audio device) becomes active. The HAMA 124 can determine, based on the configuration information, that the G1_non_trans type is associated with guest 1 playing multimedia, for example. Further, when a stream of G1_non_trans type audio is ducked to 0 by a separate non-transient audio type, the HAMA 124 can deduce that the class 1 guest should be requested to pause its non-transient playback.

A class 2 guest has an audio management subsystem that is able to direct audio of different usages to different virtual audio devices, similar to a class 1 guest. However, a class 2 guest does not distinguish between transient and non-transient audio when routing the audio to the virtual audio devices. For transient audio, the HAMA 124 is able to determine an audio management state of a class 2 guest based on audio activities of the virtual audio devices. However, the HAMA 124 is not able to determine an audio management state of a class 2 guest based on audio activities related to non-transient audio. For non-transient audio, a GAMA (e.g., 126-1 or 126-2) according to some implementations of the present disclosure would send a state message or another type of state information to notify the HAMA 124 that the audio is transient audio.

More generally, in further examples, a GAMA can provide state information indicating whether audio is transient or non-transient.

A class 3 guest has an audio management subsystem that mixes all audio from the guest into a single audio stream that is routed to a single virtual audio device (or a single virtual audio channel). As a result, the HAMA 124 would not be able to distinguish between different audio types or usages based on audio activities of a class 3 guest. To address the foregoing, a GAMA can provide a state message or other state information informing the HAMA 124 of the guest's audio-management state.

A class 4 guest has an audio management subsystem that mixes all audio from the guest into a single audio stream that is routed to a single virtual audio device (or a single virtual audio channel). Also, a class 4 guest does not have a mechanism to notify the HAMA 124 of an audio management state of the class 4 guest. An example of a class 4 guest is guest GN in FIG. 1, which is without a GAMA.

In some examples, the I/O audio subsystem 132 can provide priority-based, audio activity triggered, ducking, suspend/resume, and pausing of audio streams. The I/O audio subsystem 132 can provide notifications of audio events whenever an audio management state within the I/O audio subsystem 132 changes for a given virtual audio device.

The I/O audio subsystem 132 can specify whether or not an audio of a given audio type can be preempted (e.g., whether an audio stream of the given audio type can be suspended or paused). The I/O audio subsystem 132 can also provide an event notification mechanism that allows external processes to be notified of changes in audio management environment of the I/O audio subsystem 132.

In some examples, the I/O audio subsystem 132 supports explicitly activating and deactivating an audio channel to simulate audio activity on that device in the absence of audio data. This allows the HAMA 124 to create proxy audio channels within the I/O audio subsystem 132 to affect host audio management changes on behalf of class 2 or 3 guests that cannot direct audio to appropriate virtual audio devices on their own. The HAMA 124 can send a control indication with respect to the proxy audio channel to affect (suspend/resume, duck, or pause) output of audio by the I/O audio subsystem 132 through an audio sink.

In some examples, the HAMA 124 can also provide a mapping (such as in the configuration information discussed further above) between guests and zones that allows correct zoned audio management even when guests use different zone identifiers or a different order of zones.

Figure 2:
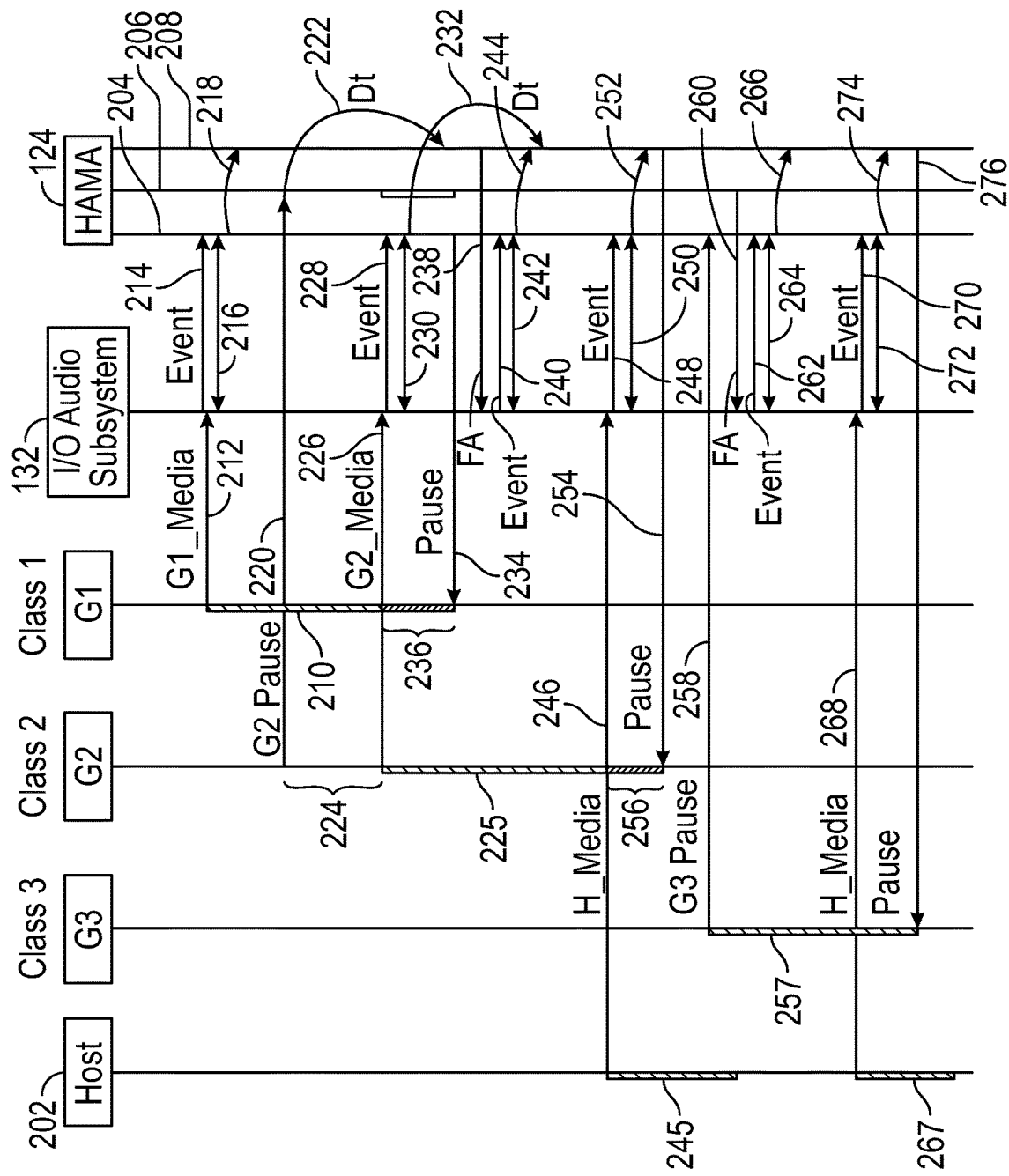
FIGS. 2-6 are flow diagrams of audio management processes according to some examples.

FIG. 2 is a message flow diagram of a process that involves various guests, the I/O audio subsystem 132, and the HAMA 124. In the example of FIG. 2, guest G1 is a class 1 guest, guest G2 is a class 2 guest, and guest G3 is a class 3 guest.

In FIG. 2, a host 202 represents an audio source in the host ECU 102, such as any of the application programs 111.

Also, in FIG. 2, three vertical lines extend below the HAMA 124. Vertical line 204 represents a zone listener (e.g., 130-1 or 130-P in FIG. 1) of the HAMA 124, which listens for audio events of the I/O audio subsystem 132.

A vertical line 206 represents logic of the HAMA 124 that receives state updates from GAMAs of guests, such as the GAMAs 126-1 and 126-2 in FIG. 1.

A vertical line 208 represents logic in the HAMA 124 that evaluates an audio management state and sends notifications (include state notifications and/or control notifications) as appropriate.

An audio source in guest G1 (a class 1 guest) is playing audio (210). Guest G1 sends (at 212) audio of the media to the I/O audio subsystem 132, such as over a respective virtual audio device. As noted above, a class 1 guest, such as G1, is able to send audio of different usages and types over respective different virtual audio devices. In response to receiving media from guest G1, the I/O audio subsystem 132 sends a corresponding event notification (214) to the HAMA 124. In response, the HAMA 124 interacts (at 216) with the I/O audio subsystem 132 to collect information about the audio activity indicated by the event notification (214).

The interaction between the HAMA 124 and the I/O audio subsystem 132 includes a series of queries and responses (an event from the I/O audio subsystem 132 to the HAMA 124, a query from the HAMA 124 to the I/O audio subsystem 132, and a response from the I/O audio subsystem 132 to the HAMA 124). A response collected by the HAMA 124 can indicate that the G1 media was received by the I/O audio subsystem 132 over a given virtual audio device that indicates a type and/or usage (transient or non-transient) of the audio (210) being played by guest G1.

Based on the collected information, the HAMA 124 makes a decision (at 218) regarding whether any action is to be taken in response to the detected audio from guest G1. Since there are no other audio being played at this time, no further action is taken by the HAMA 124.

Subsequently, guest G2 (a class 2 guest) sends (at 220) a pause indication to the HAMA 124. This pause indication is sent by the GAMA 126-2 of guest G2 to the HAMA 124. The pause indication can be in the form of a state message for indicating an audio management state of audio that is to be played by guest G2.

The HAMA 124 recognizes that guest G2 is a class 2 guest, and thus, is aware that an audio management state determination for guest G2 would involve evaluation of both audio stream activity and any state messages sent by guest G2. Accordingly, the HAMA 124 triggers a delay (222) to wait a specified time duration (Dt) before making a decision on what to do next in response to the pause indication (220). In other words, the HAMA 124 should not base its decision solely on the pause indication, but also should await audio activity of guest G2.

In the example of FIG. 2, there is a delay 224 between the sending of the pause indication (220) and the sending (at 226) of media corresponding to the pause indication. For example, the media (sent at 226) from guest G2 may be media of a media player, which would cause other audio to be paused while the media from guest G2 is being played. In response to the G2 media (226), the I/O audio subsystem 132 sends an event notification (228) to the HAMA 124. In response to the event notification (228), the HAMA 124 collects information (at 230) about the event. The HAMA 124 can trigger another delay (Dt) (232) before making a final decision regarding any action to take in response to the event notification (228), in case further G2 media or state messages are received. Since the G2_media audio type channel becomes active within Dt (222) of the pause message (220) (in other words, the G2 media (226) is sent before expiration of Dt (222)), the HAMA 124 proceeds to take action in response to receipt of the G2 media (226) based on the state information related to G2's audio activity—the HAMA 124 does not have to wait for expiration of the delay (Dt) (222) before taking action. If the G2_media audio preceded the pause message, the HAMA 124 would introduce a delay (Dt) 232 during which a received pause message from G2 would allow the HAMA 124 to make a final decision on the impact of G2's audio activity. If Dt expired with the other half of the audio playback (e.g., media after pause message or pause message after media) not having been received, then the HAMA 124 can take action following expiration of Dt.

In response to receiving the event notification (228) and the collection of the information (at 230), the HAMA 124 sends (at 234) a pause message to guest G1 (or more specifically, to the GAMA 126-1 in guest G1), to cause guest G1 to pause playing its audio 210.

Note that upon the I/O audio subsystem 132 receiving guest G2 media (226), the I/O audio subsystem 132 caused the audio of guest G1 to be ducked to volume 0 (indicated by 236), which means that the I/O audio subsystem 132 caused the sound volume of the G2 media as played by an audio output device to be reduced. In some examples, the HAMA 124 sends a suspend or pause message in response to a guest's audio being ducked to volume 0—otherwise, the audio playback of the guest can continue by mixing the audio of the guest with the other audio (e.g., G1 media mixed with G2 media).

The HAMA 124 further sends (at 238) a force activation (FA) to the I/O audio subsystem 132. The force activation is a control message that causes the I/O subsystem 132 to pause playback of all audio to allow the audio from guest G2 to play. The force activation of a non-transient audio channel is performed to pause audio not controlled by messages from the HAMA 124 (such as host media).

Responsive to the force activation, the I/O audio subsystem 132 sends an event notification (240) to the HAMA 124, at which point the HAMA 124 can collect (at 242) additional information from the I/O audio subsystem 132. Based on the collected information, the HAMA 124 makes another evaluation (at 244) regarding whether any further action is to be performed. The evaluation (at 244) determines that no further action is to be performed by the HAMA 124.

At a later time, the host 202 plays audio (245) and sends (at 246) host media to the I/O audio subsystem 132. In response to the host media (246), the I/O audio subsystem 132 ducks the guest G2 audio (as indicated at 256).

In response, the I/O audio subsystem 132 sends an event notification (248) to the HAMA 124. The HAMA 124 then collects (at 250) information about the event, and performs an evaluation (at 252) of an action to take. Based on the evaluation (at 252), the HAMA 124 sends (at 254) a pause message to guest G2 (or more specifically, to the GAMA 126-2 in guest G2).

At a later time, while the host 202 is playing the audio (245), guest G3 plays audio (257) and sends (at 258) a pause indication to the HAMA 124. In response, the HAMA 124 sends (at 260) a force activation to cause the I/O audio subsystem 132 to pause all other audio, including the audio (245) being played at the host 202. Note that since the I/O audio subsystem 132 is part of the host ECU 102, the HAMA 124 does not have to send another control message to pause the playing of the audio (245) by the host 202.

In response to the force activation, the I/O subsystem 132 sends an event notification (262) to the HAMA 124, which in response collects (at 264) information for the event. The HAMA 124 then makes an evaluation (at 266) of any action to take.

While the guest G3 media (257) is playing and after the previous host audio (245) has been paused, the host 202 can play further audio (267) and send (at 268) further host media to the I/O audio subsystem 132. The further audio (267) can be based on a resumption of the paused audio (245) or new audio played by the host 202.

In response to the further host media, the I/O audio subsystem 132 sends an event notification (270) to the HAMA 124, which collects (at 272) information of the event and evaluates (at 274) an action to take. The action includes sending (at 276) a pause message to the guest G3 (or more specifically, to a GAMA in guest G3) to pause the playing of the audio 257.

Figure 3:
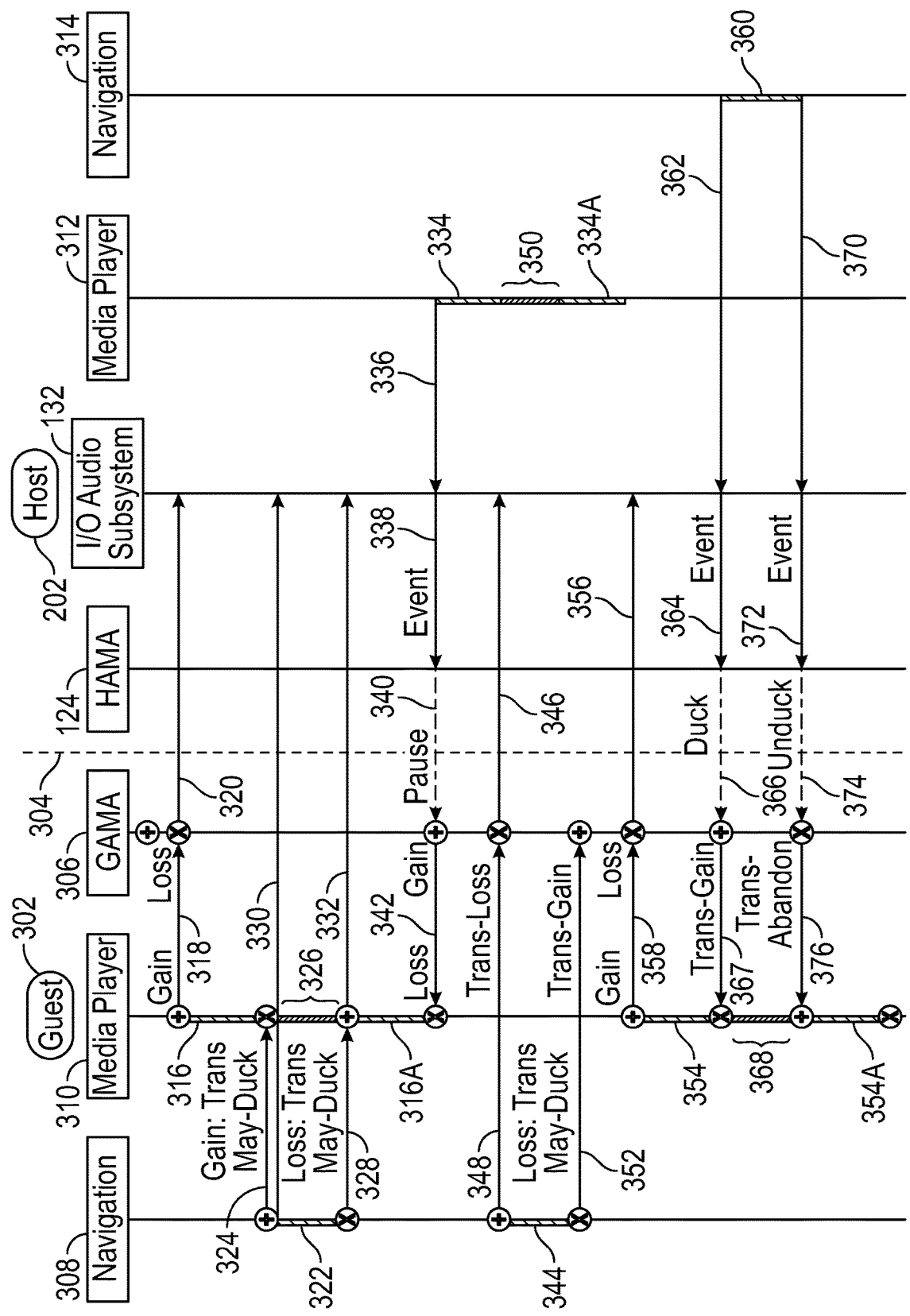

FIG. 3 shows another example that involves an interaction between the host 202 and a guest 302. A vertical line 304 represents a boundary between the host 202 and the guest 302.

In the example of FIG. 3, the guest 302 is assumed to be a class 1 guest. The guest 302 includes a navigation application 308 and a media player 310, which are examples of audio sources in the guest 302. The guest 302 also includes a GAMA 306.

The host 202 includes the HAMA 124, the I/O audio subsystem 132, a media player 312, and a navigation application 314, which are examples of audio sources in the host 202.

The media player 310 in the guest 302 starts playing audio (316), and sends (at 318) a control message to the GAMA 306. In examples according to FIG. 3 (and similarly FIGS. 4-6 below), it is assumed that an ANDROID OS is employed by each guest. With the ANDROID OS, a first entity gains focus when the first entity starts playing audio, and a second entity loses focus when the first entity acquires focus. The media player 310 gains focus by sending (at 318) the control message the media player 310 to the GAMA 306, and the GAMA 306 loses focus in response to the control message.

The media player 310 also sends (at 320) its media to the I/O audio subsystem 132. In response to the media received from the media player 310 in the guest 302, the I/O audio subsystem 132 may perform interactions with the HAMA 124 similar to the interactions depicted in FIG. 2, but which are not shown in FIG. 3 for brevity.

Subsequently, the navigation application 308 starts playing audio (322), and sends (at 324) a control message to the media player 310, where the control message provides an indication that the media player 310 is to duck its audio (316). The navigation application 308 also sends (at 330) its media to the I/O audio subsystem 132.

In response to the control message (324), the media player 310 ducks its audio in a portion (326). When the audio (322) of the navigation application 308 is completed, the navigation application 308 sends (at 328) another control message to the media player 310, which can resume normal playback of its audio (316A).

When the media player 310 resumes non-ducked audio, the media player sends (at 332) its media to the I/O audio subsystem 132.

At a later time, the media player 312 in the host 202 starts playing audio (334) by sending audio data commencing at (336) to the I/O audio subsystem 132.

In response, the I/O audio subsystem 132 sends (at 338) an event to the HAMA 124, and the HAMA 124 examines the audio state presented by the I/O audio subsystem 132.

The HAMA 124 examines the audio state and notes that the guest audio channel is ducked to 0 by other non-transient audio but is still playing (based on the media sent at 332). As a result, the HAMA 124 sends (at 340) a pause message to the GAMA 306 in the guest 302. In response, the GAMA 306 sends a pause indication to the media player 310 in the guest 302 to pause playing of its audio (316).

Subsequently, the navigation application 308 plays audio (344) and sends (at 346) the media to the I/O audio subsystem 132. The navigation application 308 also sends (at 348) a control message to the GAMA 306. Upon receiving the media from the navigation application 308, the I/O audio subsystem 132 ducks the audio (334) played by the media player 312 (as indicated at 350). When the navigation application 308 in the guest 302 finishes playing its audio (344), the navigation application 308 sends (at 352) a control message to the GAMA 306. Also, the media player 312 in the host 202 can resume playing its audio (334A) at a normal level (non-ducked sound volume). The ducking/unducking or suspend/resume of audio channels on the host is a function of the I/O audio subsystem's native audio management. In this use case, none of the audio channels the HAMA 124 is monitoring are preempted by the I/O audio subsystem's audio management, so the HAMA 124 does not have to take any action. If the guest 302 were a class 2 or 3 guest, a message from a GAMA would be used and the HAMA 124 would force activate a channel in the I/O audio subsystem 132 to cause the corresponding changes within the I/O audio subsystem's audio management state.

Next, the media player 310 in the guest 302 plays further audio (354) and sends (at 356) the media to the I/O audio subsystem 132. The media player 310 also sends (at 358) a control message to the GAMA 306. Because of the media (356) from the guest 302, the I/O audio subsystem 132 causes the host's media player 312 to pause.

While the media player 310 in the guest 302 is playing its further audio (354), the navigation application 314 in the host 202 starts playing audio (360). The navigation application 314 sends (at 362) audio to the I/O audio subsystem 132. In response, the I/O audio subsystem 132 sends (at 364) an event to the HAMA 124. The HAMA 124 discovers the G1 media channel (356) is now ducked.

In response to the detection of the ducked state of the guest 1 media channel (356), the HAMA 124 sends (at 366) a duck message to the GAMA 306 in the guest 302. The GAMA 306 sends (at 367) a control message to inform the media player 310 that its audio is ducked as indicated in a portion 368.

When the navigation application 314 finishes playing its audio, the navigation application closes its audio channel (at 370) to the I/O audio subsystem 132. In response, the I/O audio subsystem 132 sends (at 372) an event to the HAMA 124, and the HAMA 124 collects the audio management state from the I/O audio subsystem 132 and discovers the audio channel (356) for the media player 310 is no longer ducked.

In response to the unducked state (discovered at 372), the HAMA 124 sends (at 374) an unduck message to the GAMA 306 in the guest 302. The unduck message causes resumption of a previously suspended second audio or to notify of unduck for a previously ducked audio. The GAMA 366 sends (at 376) a control message to the media player 310 to inform the media player 310 that its audio is no longer being ducked (354A).

Figure 4:
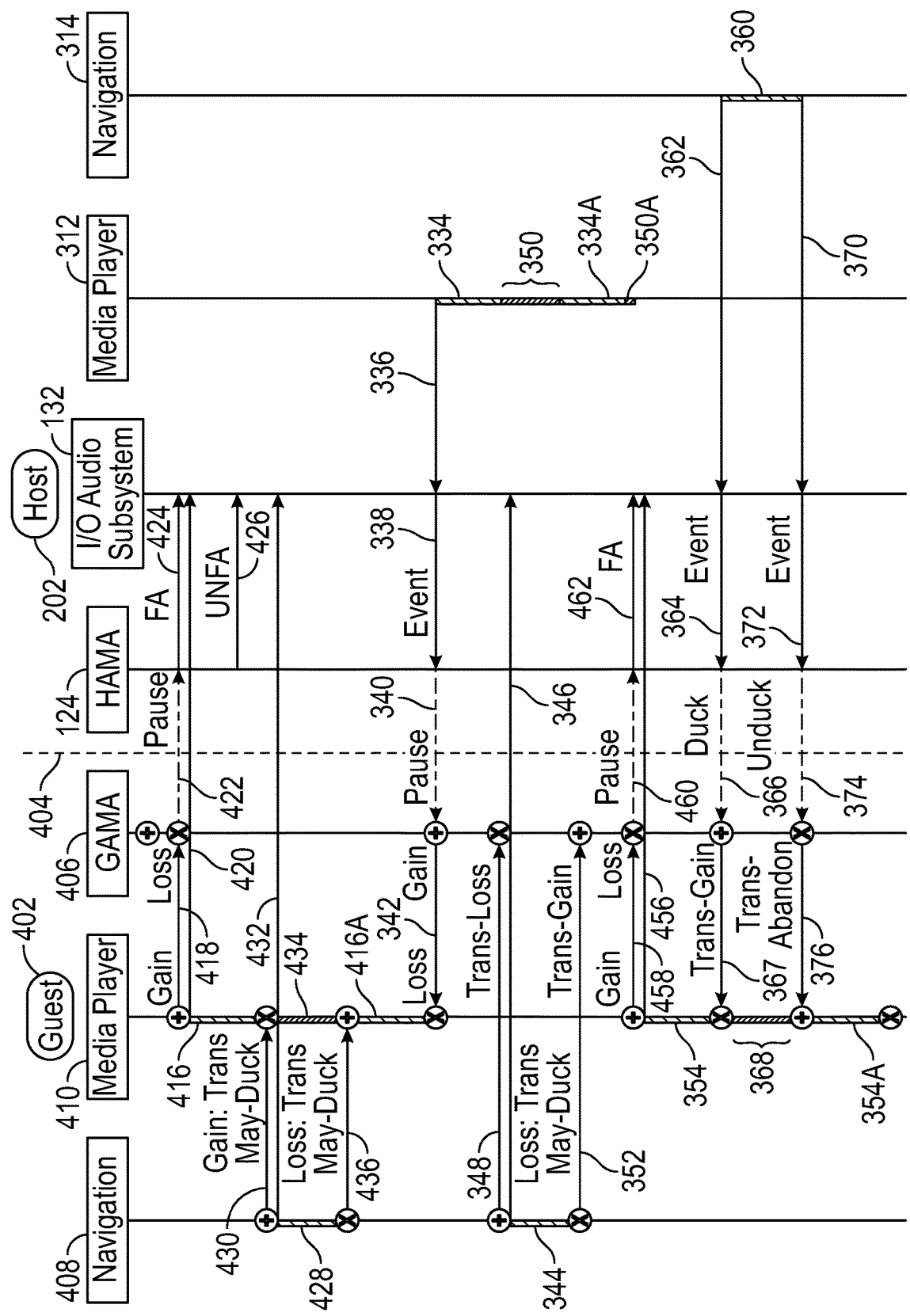

FIG. 4 shows another example that involves an interaction between the host 202 and a guest 402. A vertical line 404 represents a boundary between the host 202 and the guest 402.

In the example of FIG. 4, the guest 402 is assumed to be a class 2 guest. The guest 402 includes a navigation application 408 and a media player 410, which are examples of audio sources in the guest 402. The guest 402 also includes a GAMA 406.

The host 202 includes the HAMA 124, the I/O audio subsystem 132, the media player 312, and the navigation application 314.

The media player 410 in the guest 402 starts playing audio (416), and sends (at 418) a control message to the GAMA 406. The media player 410 also sends (at 420) its media to the I/O audio subsystem 132.

In response to the control message (418), the GAMA 406 sends (at 422) a pause message to the HAMA 124. In response to the pause message, the HAMA 124 sends (at 424) a force activation (FA) of a media channel to the I/O audio subsystem 132. The force activation of a media channel causes the I/O audio subsystem 132 to duck to 0 and pause audio of equal or lower priority. Shortly thereafter, the HAMA 124 sends (at 426) an unforce activation (UNFA) to the I/O audio subsystem 132. Deactivating the force active channel causes the I/O audio subsystem 132 to remove ducking allowing guest audio to be heard.

Subsequently, the navigation application 408 starts playing audio (428), and sends (at 430) a control message to the media player 410, where the control message provides an indication that the media player 410 is to duck its audio (416). The navigation application 408 also sends (at 432) its media to the I/O audio subsystem 132.

In response to the control message (430), the media player 410 ducks its audio in a portion (434). When the audio (428) of the navigation application 408 is completed, the navigation application 408 sends (at 436) another control message to the media player 410, which can resume normal playback of its audio (416A).

When the media player 310 resumes non-ducked audio, the media player sends its media to the I/O audio subsystem 132.

Tasks 334 to 352 in FIG. 4 are the same as those in FIG. 3, and are not explained again.

Next, the media player 410 in the guest 402 plays further audio (354) and sends (at 456) the media to the I/O audio subsystem 132. The media player 410 also sends (at 458) a control message to the GAMA 406.

In response, the GAMA 406 sends (at 460) a pause message to the HAMA 124, which sends (at 462) a force activation (FA) to the I/O audio subsystem 132. The receipt of the media (456) causes ducking (350A) of the audio 334A being played by the media player 312 in the host 202. The force activation (462) causes pausing of the media played by the media player 312.

While the media player 410 in the guest 402 is playing its further audio (354), the navigation application 314 in the host 202 starts playing audio (360). Further tasks in response to the audio (360) are similar to those of FIG. 3.

Figure 5:
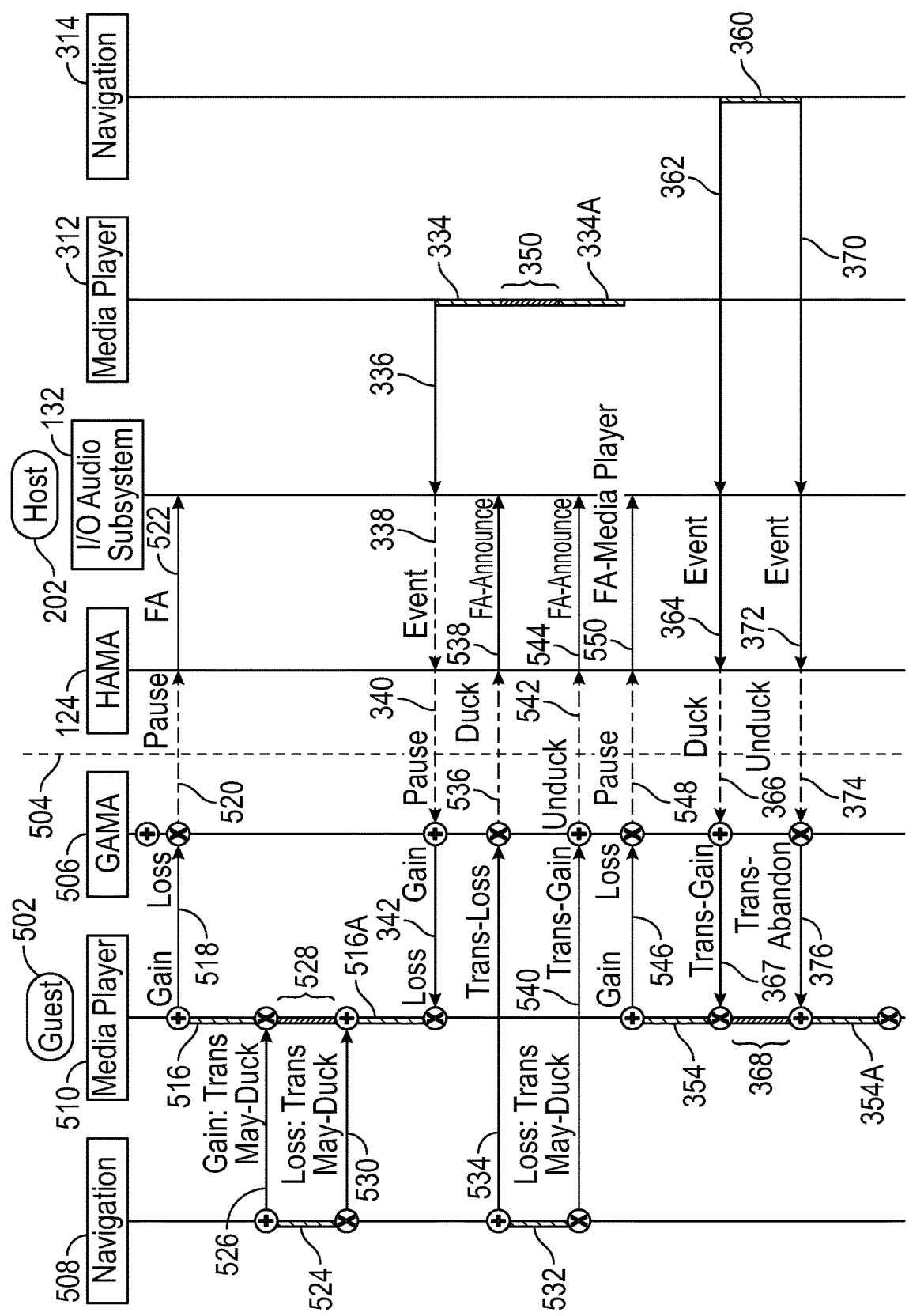

FIG. 5 shows another example that involves an interaction between the host 202 and a guest 502. A vertical line 504 represents a boundary between the host 202 and the guest 502.

In the example of FIG. 5, the guest 502 is assumed to be a class 3 guest. The guest 502 includes a navigation application 508 and a media player 510, which are examples of audio sources in the guest 502. The guest 502 also includes a GAMA 506.

The host 202 includes the HAMA 124, the I/O audio subsystem 132, the media player 312, and the navigation application 314.

The media player 510 in the guest 502 starts playing audio (516), and sends (at 518) a control message to the GAMA 406. Note that the media player 510 of the class 3 guest 502 sends the media to the I/O audio subsystem 132 using a default audio type that does not affect audio management on the host 202 and is not monitored by the HAMA 124.

In response to the control message (518), the GAMA 406 sends (at 520) a pause message to the HAMA 124. In response to the pause message, the HAMA 124 sends (at 522) a force activation (FA) to the I/O audio subsystem 132, to pause playback of equal or lower priority audio.

Subsequently, the navigation application 508 starts playing audio (524), and sends (at 526) a control message to the media player 510, where the control message provides an indication that the media player 510 is to duck its audio (516).

In response to the control message (526), the media player 410 ducks its audio in a portion (528). When the audio (524) of the navigation application 508 is completed, the navigation application 508 sends (at 530) another control message to the media player 510, which can resume normal playback of its audio (516A).

When the media player 310 resumes non-ducked audio, the media player sends its media to the I/O audio subsystem 132.

Tasks 334 to 342 in FIG. 5 are the same as those in FIG. 3, and are not explained again.

Subsequently, the navigation application 508 plays audio (532) and sends (at 534) a control message to the GAMA 506. In response, the GAMA 506 sends (at 536) a duck message to the HAMA 124, which responds by sending (at 538) a force activation-announce (FA-Announce) to the I/O audio subsystem 132 to duck other audio (including ducking of the audio 334 of the media player 312 in the portion 350).

When the navigation application 508 in the guest 502 finishes playing its audio (532), the navigation application 508 sends (at 540) a control message to the GAMA 306. In response, the GAMA 506 sends (at 542) an unduck message to the HAMA 124, which responds by sending (at 544) an unforce activation-announce (UNFA-Announce) to the I/O audio subsystem 132 to unduck other audio (so that the media player 312 can resume normal playback of its audio 334A).

Next, the media player 510 in the guest 502 plays further audio (354) and sends (at 546) a control message to the GAMA 506. In response, the GAMA 506 sends (at 548) a pause message to the HAMA 124, which sends (at 550) a force activation-media proxy (FA-Media Proxy) to the I/O audio subsystem 132. The FA-Media Proxy indication is sent with respect to a proxy audio channel created by the HAMA 124 for the class 3 guest 502. The FA-Media Proxy causes the I/O audio subsystem 132 to pause other audio, including the audio 334A of the media player 312.

While the media player 510 in the guest 502 is playing its further audio (354), the navigation application 314 in the host 202 starts playing audio (360). Further tasks in response to the audio (360) are similar to those of FIG. 3.

Figure 6:
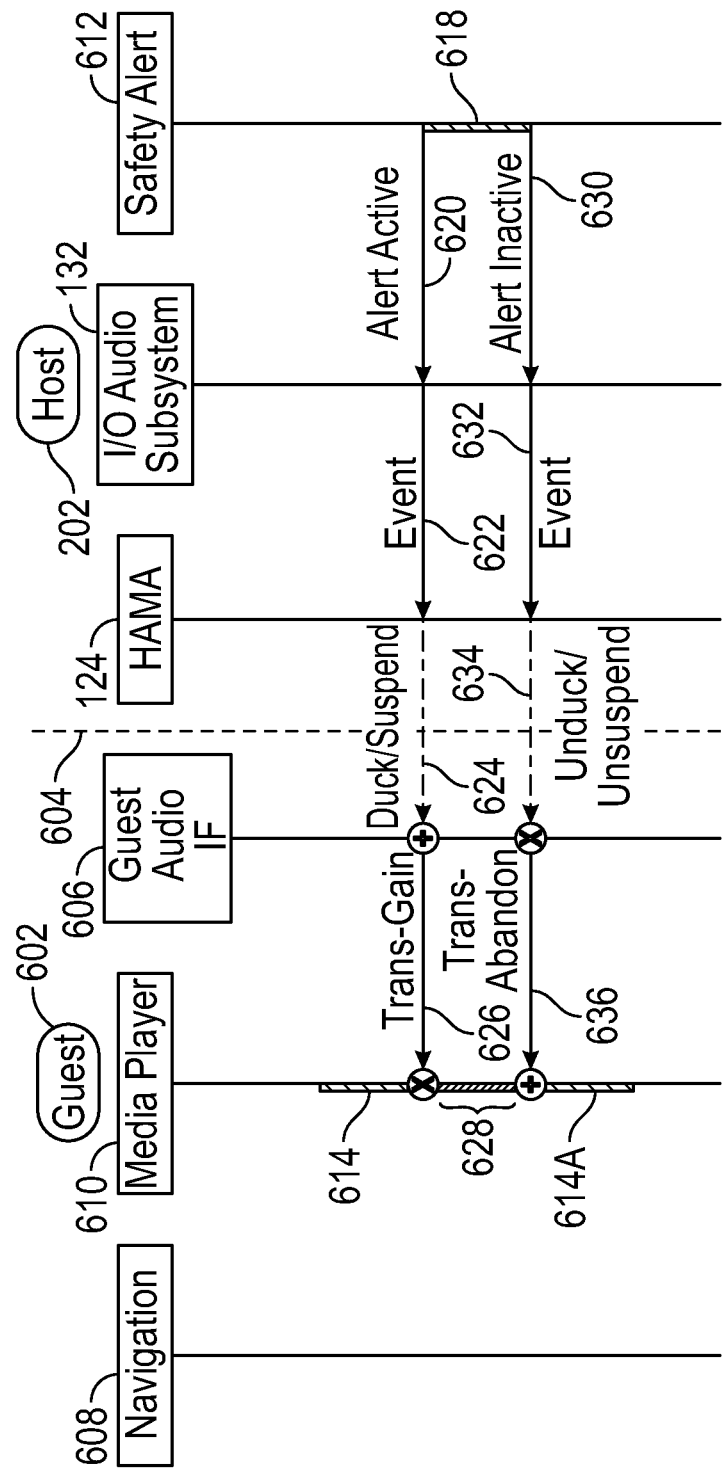

FIG. 6 shows another example that involves an interaction between the host 202 and a guest 602. A vertical line 604 represents a boundary between the host 202 and the guest 602.

In the example of FIG. 6, the guest 602 is assumed to be a class 4 guest. The guest 602 includes a navigation application 608 and a media player 610, which are examples of audio sources in the guest 602. The guest 602 also includes a guest audio interface 606, which is different from a GAMA. As an example, the guest audio interface 606 can be a native audio service, such as 124-N in FIG. 1.

The host 202 includes the HAMA 124, the I/O audio subsystem 132, and a safety alert application 612.

The media player 610 in the guest 602 starts playing audio (614).

While the media player 610 is playing its audio (614), the safety alert application 612 in the host 202 starts playing audio (618). The safety alert application 612 sends (at 620) alert audio to the I/O audio subsystem 132. In response, the I/O audio subsystem 132 sends an event notification, and the HAMA 124 collects (at 622) information of the event. The HAMA 124 notes that a suspend channel identified in the class 4 guest configuration is active. In response, the HAMA 124 sends (at 624) a duck/suspend message to the guest audio interface 606 in the guest 602. The guest audio interface 606 sends (at 626) a control message to the media player 610 to duck or suspend its audio (628), as indicated in a portion 628.

When the safety alert application 612 finishes playing its audio, the safety alert application closes its audio connection (at 630) to the I/O audio subsystem 132. In response, the HAMA 124 receives an event from the I/O audio subsystem 132 and collects the event data (at 632). The HAMA 124 notes that the previously active suspend channel is no longer present.

The HAMA 124 sends (at 634) an unduck or unsuspend control message to the guest audio interface 606, which sends (at 636) a control message to the media player 310 to unduck or unsuspend its audio to resume playing at an unducked level (614A).

In the foregoing examples, guests of classes 1, 3, and 4 are associated with a respective single mechanism for determining an audio management state of each guest. The single mechanism includes different virtual audio devices (class 1), different state messages (class 3), or nothing (class 4).

For class 2 guests, two mechanisms are used by the HAMA 124 to determine an audio management state of a guest: audio activity reported by the I/O audio management subsystem 132 in response to audio of different virtual audio devices, and state messages informing whether an audio is transient or non-transient. Since the audio activity and state messages are not synchronized, the HAMA 124 can implement a synchronization mechanism, in the form of an evaluation delay (e.g., Dt in FIG. 2).

Figure 7:
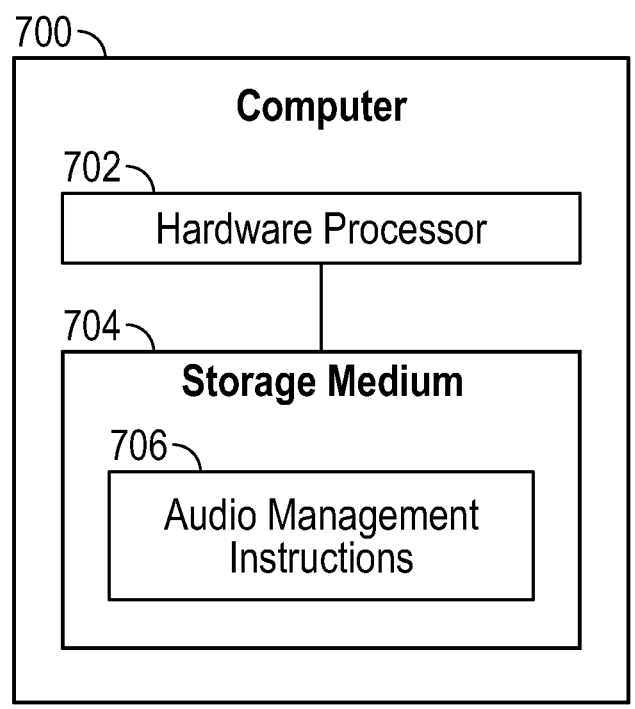
FIG. 7 is a block diagram of a computer according to some examples.

FIG. 7 is a block diagram of a computer 700 according to some examples. The computer 700 can be implemented using one or more ECUs in a vehicle. Alternatively, the computer 700 can include one or more other types of computing devices.

The computer 700 includes one or more hardware processors 702. A hardware processor can include a microprocessor, a core of a multi-core microprocessor, a microcontroller, a programmable integrated circuit, a programmable gate array, or another hardware processing circuit.

The computer 700 includes a non-transitory machine-readable or computer-readable storage medium 704 storing machine-readable instructions (e.g., audio management instructions 706) that are executable on the one or more hardware processors 702. The audio management instructions 706 can include instructions of the HAMA 124 and/or the GAMAs.

The storage medium 704 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a control audio management engine configured to interact with guest audio services in respective guests that have different audio management capabilities, an indication of a start of a first audio in a first guest of the guests, the indication comprising an audio stream;
receiving, by the control audio management engine, a state message indicating a start of a second audio in a second guest of the guests;
determining, by the control audio management engine, an audio management state of the second audio based on the state message from the second guest; and
sending, by the control audio management engine to a third guest of the guests, control information to affect playback of a third audio that is playing in the third guest.

2. A method comprising:
receiving, by a control audio management engine configured to interact with guest audio services in respective guests that have different audio management capabilities, an indication of a start of a first audio in a first guest of the guests, the indication comprising an audio stream;
determining, by the control audio management engine, an audio management state of the first audio based on which of a plurality of virtual audio devices or channels is associated with the first audio, wherein the audio stream is from a respective virtual audio device or channel of the plurality of virtual audio devices or channels; and
sending, by the control audio management engine to a second guest of the guests, control information to affect playback of a second audio that is playing in the second guest.

3. The method of claim 2, wherein the determining of the audio management state of the first audio is further based on a state message from the first guest.

4. The method of claim 2, wherein the first guest comprises a guest operating system (OS) that provides a respective audio management capability of the different audio management capabilities.

5. The method of claim 4, wherein the first guest comprises a virtual machine in a computing environment that further includes a hypervisor.

6. The method of claim 4, wherein the second guest comprises an electronic control unit (ECU) that is separate from an ECU including the control audio management engine.

7. The method of claim 2, comprising:
receiving, by the control audio management engine, a state message indicating a start of the second audio in the second guest; and
determining, by the control audio management engine, an audio management state of the second audio based on the state message from the second guest.

8. The method of claim 1, comprising:
interacting, by the control audio management engine, with a guest audio management agent in the third guest, the interacting comprising sending the control information to the guest audio management agent.

9. The method of claim 1, comprising:
interacting, by the control audio management engine, with a native audio service in the first guest to affect playback of audio in the first guest.

10. The method of claim 1, comprising:
accessing, by the control audio management engine, configuration information that specifies which guests belong to which respective classes, wherein a class of a guest is dependent upon an audio management capability of the guest.

11. The method of claim 1, wherein the guests are part of a first zone, the method further comprising:
performing audio management with respect to guests in a second zone different from the first zone.

12. The method of claim 11, wherein in the first zone audio is output by a first audio sink through one or more first audio output devices, and in the second zone audio is output by a second audio sink through one or more second audio output devices.

13. The method of claim 1, wherein the guests are executed in one or more electronic control units (ECUs) of a vehicle.

14. A method comprising:
- receiving, by a control audio management engine configured to interact with guest audio services in respective guests that have different audio management capabilities, an indication of a start of a first audio in a first guest of the guests, the indication comprising an audio stream;
- creating, by the control audio management engine, a proxy audio channel in an input/output (I/O) audio subsystem for a second guest of the guests; and
- sending, by the control audio management engine, a control indication with respect to the proxy audio channel to affect output of a second audio in the second guest by the I/O audio subsystem through an audio sink.

15. A system comprising:
- one or more processors; and
- a non-transitory storage medium storing control audio management instructions executable on the one or more processors to:
  - interact with guest audio services in respective guests that have different audio management capabilities;
  - receive an indication of a start of a first audio in a first guest of the guests, the indication comprising an audio stream, wherein the first guest comprises one of:
    - a guest according to a first class that is able to direct audio of different types and usages to different virtual audio devices, or
    - a guest according to a second class that is able to direct audio of different types to different virtual audio devices, and to send state information indicating one of multiple different usages;
  - send, to a second guest of the guests, control information to affect playback of a second audio that is playing in the second guest.

16. The system of claim 15, wherein the control information to affect playback of the second audio comprises one of:
- a suspend indication to suspend the playback of the second audio,
- a duck indication to duck the second audio,
- a pause indication to pause the playback of the second audio, or
- an unduck indication to resume a previously suspended second audio or to notify of unduck for a previously ducked second audio.

17. The system of claim 15, comprising:
- a hypervisor,
- wherein the first guest comprises a virtual machine created by the hypervisor.

18. A non-transitory machine-readable storage medium comprising instructions that upon execution cause a system to:
- receive, at a control audio management engine configured to interact with guest audio services in respective guests that have different audio management capabilities, an indication of a start of a first audio in a first guest of the guests, the indication comprising an audio stream, wherein the first guest comprises a plurality of virtual audio devices or channels, and wherein the first guest comprises a service to direct audio of different types to respective different virtual audio devices or channels of the plurality of virtual audio devices or channels;
- determine, at the control audio management engine, an audio type of the first audio based on which of the different virtual audio devices or channels provided the first audio to an audio subsystem; and
- send, from the control audio management engine to a second guest of the guests, control information to affect playback of a second audio that is playing in the second guest.

19. The non-transitory machine-readable storage medium of claim 18, wherein the different audio management capabilities comprise:
- a first audio management capability in which a guest is able to send audio of different types and different usages to respective different virtual audio devices, or
- a second audio management capability in which a guest is able to send audio of different types to respective different virtual audio devices and to provide indications of different audio usages using state messages, or
- a third audio management capability in which a guest is unable to send audio to virtual audio devices and is able to provide indications of different audio types and usages using state messages.

20. The system of claim 15, wherein the control audio management instructions are executable on the one or more processors to:
- determine an audio management state of the first audio based on which of a plurality of virtual audio devices or channels is associated with the first audio, wherein the audio stream is from a respective virtual audio device or channel of the plurality of virtual audio devices or channels.

* * * * *